Patented Oct. 15, 1929

1,732,179

UNITED STATES PATENT OFFICE

EDMUND BREUNING, OF HAGEN, AND OTTO SCHNEIDER, OF FRANKFORT-ON-THE-MAIN, GERMANY, ASSIGNORS, BY MESNE ASSIGNMENTS, TO THE ELECTRIC STORAGE BATTERY COMPANY, OF PHILADELPHIA, PENNSYLVANIA, A CORPORATION OF NEW JERSEY

PROCESS OF MANUFACTURING NICKEL FLAKES FOR USE AS ADMIXTURE IN THE ACTIVE MATERIAL OF ALKALINE ACCUMULATORS

No Drawing. Application filed July 9, 1927, Serial No. 204,654, and in Germany July 27, 1926.

In the manufacture of very thin sheets of nickel for use in minute flakes as active material in electric accumulators, it was hitherto usual to electrolytically deposit alternating layers of nickel and copper on a suitable cylindrical form, subsequently removing the deposit in the shape of a hollow cylinder consisting of a plurality of layers of nickel and copper and cutting the latter up into small squares and finally dissolving the copper deposit, leaving the nickel flakes unchanged and separate from each other. On account of the losses in electrical and chemical energy when depositing and dissolving the copper, this method of producing nickel flakes is decisively uneconomical. In the present invention these losses are avoided by producing a layer of nickel on the cylindrical form and in known manner, anodically polarizing the surface of the deposit, then depositing a further layer of nickel, the surface of which is in turn also anodically polarized, and continuing the process until a suitable plurality of layers of nickel have been produced in the form of a hollow cylinder which is cut open, removed from the cylindrical form and cut up into small pieces. These small pieces are subsequently separated into their various layers by the action of a very weak acid solution, for instance a $\frac{1}{10}$ per cent solution of sulphuric acid which attacks the nickel, and, penetrating into the capillary spaces between the layers of nickel, produces hydrogen gas which forces the individual layers asunder.

What we claim is:

A process for manufacturing nickel flakes for use as admixture in the active material of alkaline accumulators which comprises forming a sheet of coherent layers of nickel, cutting said sheet of nickel layers into small pieces, and subjecting the pieces to the action of a weak acid solution which slowly attacks the nickel and penetrates between the layers developing hydrogen which forces the individual layers asunder.

In testimony whereof we affix our signatures.

EDMUND BREUNING.
OTTO SCHNEIDER.